Figure 1A:
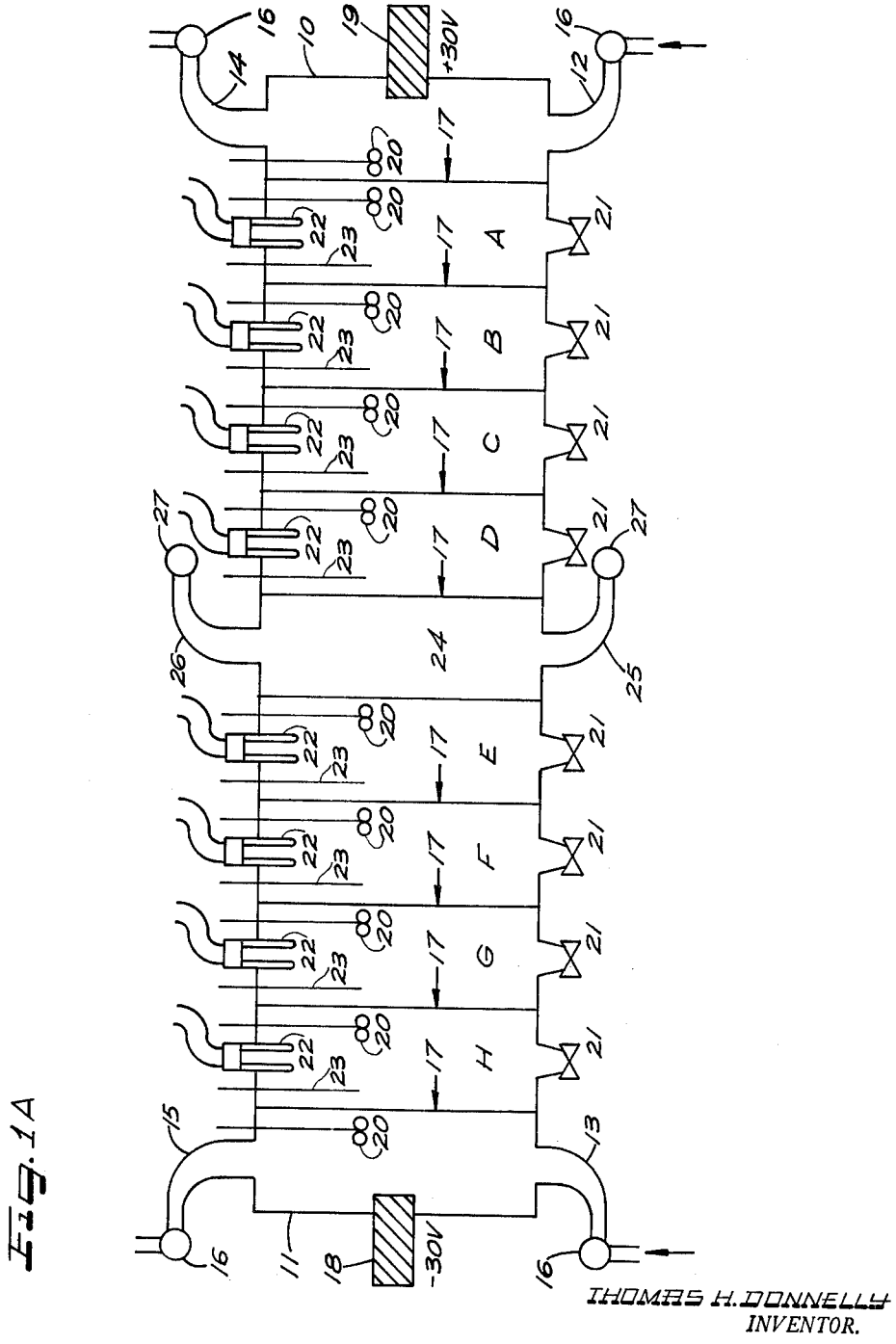

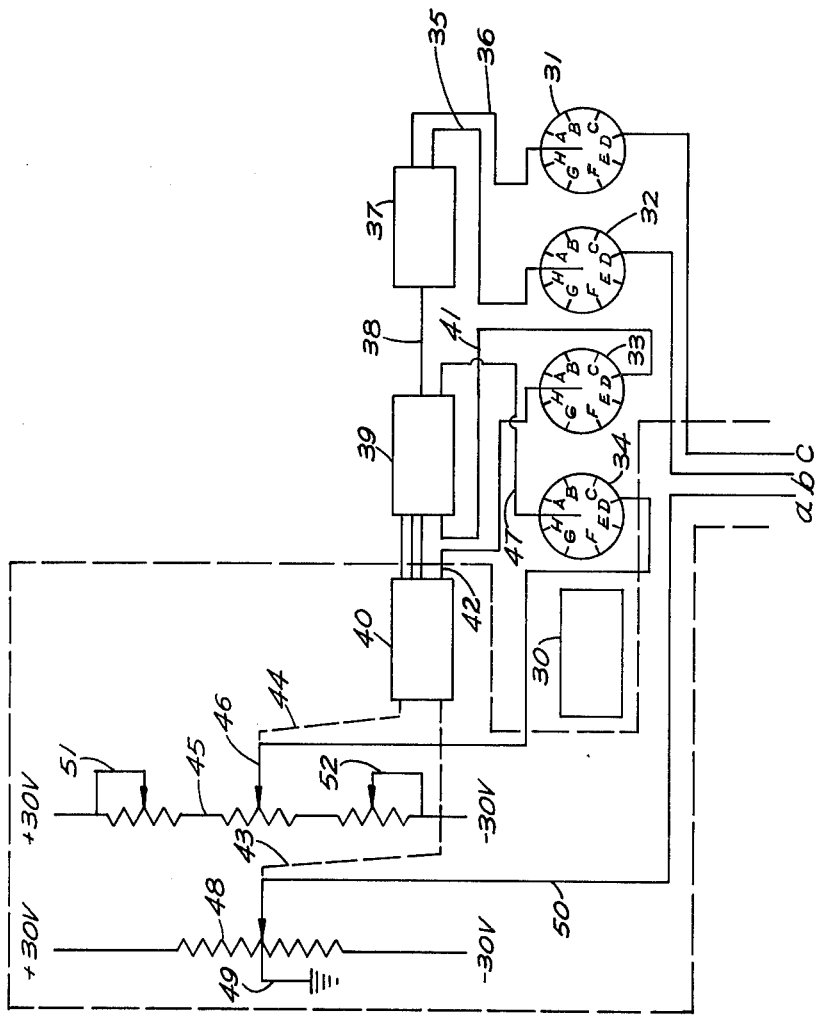

United States Patent Office 3,240,692
Patented Mar. 15, 1966

3,240,692
ELECTROPHORETIC FRACTIONATION OF AMPHOLYTES
Thomas H. Donnelly, Western Springs, Ill., assignor to Swift & Company, Chicago, Ill., a corporation of Illinois
Filed Mar. 19, 1965, Ser. No. 443,772
6 Claims. (Cl. 204—180)

This is a continuation-in-part of my prior pending application Ser. No. 130,051, filed August 8, 1961.

This invention relates to a method and apparatus for concentrating and fractionating ampholytes from solutions containing ampholytes.

Amphoteric materials are often found as mixtures of individual amphoteric substances and it becomes necessary if reasonably pure substances are desired to fractionate these mixtures.

Most proteins derived from animal and vegetable sources are amphoteric in that although they are made up of charged molecules they can be characterized by isoelectric points or pH values at which they are neutral. The separation of proteins from solutions containing one or more proteins has in the past been carried out by precipitation and coagulation of the individual protein at its isoelectric point. Yet, no rapid and efficient method for continuously fractionating and isolating ampholytes from solutions containing several such ampholytes has been suggested.

It is, therefore, an object of this invention to provide an improved method and apparatus well suited to the continuous fractionation of a mixture of ampholytes.

Another object of the invention is the provision of apparatus which is substantially automatic requiring only a minimum of attention in continuously separating and fractionating ampholytes from a liquid carrier containing such ampholytes.

Still another object of the invention is the provision of an improved method for fractionating solutions of ampholytes to provide one or more purified fractions.

Additional objects, if not specifically set forth herein, will be readily apparent to those skilled in the art from the detailed description of the invention which follows.

Generally, the invention is concerned with a method for continuously separating ampholytes from a liquid carrier containing one or more ampholytes in solution. Separation of the ampholytic materials is achieved by passing the solution through a zone having an electric potential impressed across the zone and, while the ampholytes are under the influences of the electric potential, conducting the amphoteric solutes through a series of zones maintained at various hydrogen ion concentrations in a pH gradient. As the solution is passed through the pH gradient the charge on the ampholytes changes and the individual ampholytes cease migrating upon reaching a region where they have no charge. The movement of ampholytes into and through the various zones causes an infinitesimal change in pH in each of the zones and the pH of the zones is automatically maintained at a constant value by means of electrical pH adjustment, herein referred to as electrotitration. The concentration of fractions in zones wherein there is no charge on the fraction permits removal of the accumulated fraction in the form of a precipitate. In this manner, various complex mixtures of ampholytic materials such as enzymes, hormones, serum proteins and animal and vegetable peptides and proteins generally can be fractionated into more or less pure aliquots.

More specifically, the process comprises the introduction of a solution containing ampholytes into an intermediate chamber of an electrolytic cell, the solution flowing normal to the flow of the electric current, and impressing a voltage across the cell to cause the ampholytes to migrate in a direction toward neutralization of the charge on the ampholyte. At any pH greater or less than the isoelectric point of a substance that substance will be more strongly ionized as a base than as an acid or more strongly ionized as an acid than as a base and will migrate toward the region at which ionization as an acid and as a base are equal. Thus, as the amphoteric materials move toward the area of no charge (isoelectric point) they are caused to pass through cell-separating members defining several cells maintained at constant pH values in a pH gradient. Each cell in the direction of the more negative electrode is maintained at a progressively higher pH and each cell in the direction of the more positive electrode is maintained at a progressively lower pH, the total cells arranged in seriatim forming a pH gradient. As the charged ampholytes migrate toward zones of no charge (isoelectric pH), the pH of the surrounding solution tends to change because of the presence of the ampholyte. A device for measuring the hydrogen ion concentration in the individual zones acts in response to the change in pH to activate an electrotitration device which serves to adjust and maintain the pH of that zone within narrow limits.

The invention can be more easily understood with reference to the accompanying drawings showing suitable apparatus for practicing the method of the invention.

FIGURE 1A is a diagrammatic illustration of an automatic fractionating apparatus.

The pH control system associated with the apparatus is shown in FIGURE 1B.

The device comprises a series of zones or compartments separating a pair of primary electrode compartments with the acid electrode compartment 10 and alkaline electrode compartment 11 representing the lower and upper ends of the pH range of the pH gradient. These electrode compartments are equipped with supply means 12 and 13 for introducing a solution to maintain the pH of these compartments constant and also are equipped with discharge conduits 14 and 15 for removal of solution from these compartments. The flow in each compartment is controlled by pumps 16 so that as much solution is discharged through the conduits as is added by the supply means.

The electrode compartments are separated from adjacent zones by permeable cell-separating members 17 which permit passage of colloidal materials but restrict the bulk flow of solvent. Suitable separating members may be comprised of water wettable ampholyte permeable membranes, foraminous material, or impervious material having one or more small openings therein, which will function to restrain liquid from movement between zones or cells while admitting the induced migration of colloidal ampholytes therebetween. The primary electrodes 18 and 19 are connected through suitable conductors to a source of electric power (now shown). The electrodes 18 and 19 can be carbon, platinum, or equivalent electrodes. The power source can be a battery or series of batteries or an electronic power supply, including rectifiers. Any source of direct current providing about 10–600 volts and about 10–500 milliamps current can be used.

The electrode compartments are also equipped as are other compartments of the apparatus with means for agitating the contents of the compartment and these agitators are shown generally as stirrers 20. Two sides of each of the intermediate or fractionating compartments are formed of permeable cell-separating members. These compartments are equipped with valves 21 permitting removal of precipitate. These intermediate cells are also equipped with pH measuring devices 22 which are connected to a pH control apparatus. Titrating electrodes 23 in each cell are connected to the pH control device as is the pH measuring device through leads *a*, *b* and *c* of FIGURE 1B.

The supply or sample introduction zone 24 is equipped with an inlet 25 and outlet 26 through which the influent and effluent electrolyte solution is circulated by pumps 27 which adjust the flow of solution through this zone and insure that as much solution enters through the inlet as leaves through the outlet.

The cells can be constructed of any substance which is an electrical nonconductor. While the disclosed apparatus is made of polymethylmethacrylate, other nonconducting substances such as glass, ceramics and other synthetic resins can be used for this purpose.

In adidtion to the aforementioned separating members 17 such membranes between cells may be made up of any suitable filtering material such as hard paper or sintered glass. A membane substance should not prevent the passage of large molecules and should not for best results have ion exchanging capabilities.

In the present case the pH measuring device is made up a glass electrode with a calomel reference cell. The platinum titrating electrode wire which is immersed in the solution in individual cells acts to add or remove electrons in the adjustment of the hydrogen ion concentration in the respective cells.

The automatic pH control device shown in FIGURE 1B is connected to the pH measuring device and electrode titrating wire shown in FIGURE 1A through leads *a*, *b* and *c*. In the drawings stepping switch is connected to the pH device and titrating wire of cell D. Switch positions for other compartments are indicated by the letters A through H. The device comprises a time cycle stepping switch 30 made up of banks 31, 32, 33 and 34. The input from leads *a*, *b* and *c* for each cell is fed into the stepping switch with the pH measurement being fed into banks 31 and 32. From these banks the pH voltage is fed by means of leads 35 and 36 into a conventional pH meter 37 such as a Beckman pH Meter Model W or equivalent. The output signal from the pH meter is fed through lead 38 to an amplifier 39 and then to servomotor 40 by means of leads 41 and 42 through bank 33 to the control winding of the servomotor.

The servomotor is directly geared as indicated at 43 and 44 to rebalance potentiometer 45 (100 kilohms) the output of which is fed through centertap 46 to bank 34 and from this bank through lead 47 to the input of the amplifier. Potentiometer 45 is attached to a source of power (60 volts) as indicated.

Also geared to the servomotor is potentiometer 48 (60 kilohms) equipped with a grounded center tap 49 and the output of this potentiometer is fed by means of lead 50 to the electrode titrating wire. Potentiometer 48 is attached across a 60 volts power source. The set point potentiometers 51 (100 kilohms) and 52 (100 kilohms) located on either side of the rebalance potentiometer are connected to the positive and negative 60 volt power source. These poentiometers are employed in setting pH values for each cell.

For individual cells potentiometer 51 is set at zero resistance for a set pH greater than 7 and potentiometer 52 is set so as to provide a certain amount of resistance. For a set pH less than 7, potentiometer 51 is adjusted to provide a certain amount of resistance and potentiometer 52 is set at zero resistance. It can be appreciated that self-contained units including all potentiometers and the servomotor are provided for each cell while the pH meter and amplifier are employed for all cells through the scanning of the stepping switch timer.

Prior to the operation of the device, the stepping switch timer is manually turned to each cell and potentiometers 51 and 52 are adjusted to provide the desired pH level for each cell by setting the potentiometers so that at the desired pH potentiometer 48 is at the neutral position.

In operation if the stepping switch is in the position indicated in the drawing and thus the pH of cell D is being measured, the sequence is as follows. Presuming the set pH for cell D is 8.5 and potentiometer 51 is at zero, potentiometer 52 is set for the voltage required to balance the output by the pH meter. If the pH as measured by electrodes 22 is greater or less than 8.5, the output signal from the pH meter will be amplified and led from the amplifier to the servomotor. The servomotor drives in a direction causing potentiometer 45 to move until the output of this potentiometer when fed through the stepping switch and to the amplifier is equal to the signal from the pH meter. Since potentiometer 48 is also geared to the servomotor the tap on this variable resistor follows the movement of the tap on potentiometer 45. This movement causes a change from the neutral position resulting in a signal from potentiometer 48 and a positive or negative voltage is applied to the electrode in the cell causing a positive or negative current flow corresponding to a raising or lowering of pH. A unique feature of the titrating electrode is that current flows through the electrode and through the circuit formed by the anode and cathode. This of course is apparent since the same voltage supply unit is employed for the automatic titrating circuit and the anode and cathode.

If the cell is at set pH the voltage from potentiometer 45 is equal to magnitude of the pH meter output voltage with the tap of potentiometer 45 at the midpoint.

The eletcrolyte solution in which the ampholyte to be fractionated is dissolved and which is present in each of the compartments including the anode and cathode compartments can be composed of a water solution of any water-soluble salt which produces a good conducting medium but does not give excessive buffering in pH regions where buffering is not desired. Particularly preferred are the alkali metal and ammonium salts of inorganic acids such as sodium phosphate, ammonium phosphate, the sulfates, etc. Alkali metal and ammonium salts of aliphatic carboxylic acids such as sodium citrate, ammonium tartrate, the carbonates, etc. may also be employed. The concentration of salt in water is not critical but there should be enough electrolyte dissolved in water to maintain solubility of the materials being fractionated and not so much as to result in excessive heat losses. Ordinarily the upper and lower limit on the electrotlyte concentration falls within the range of 0.01–0.1 N solutions.

The method is illustrated in the following example wherein papain is fractionated. The example is intended to be illustrative in nature and should not be considered limitative in any sense.

*Example I*

A solution of papain was prepared by suspending crude papain in water and then adding sodium phosphate to the suspension to solubilize the enzyme. This solution comprising about 5% crude papain by weight in 0.05 M aqueous sodium phosphate was introduced as the influent at 25 in the apparatus. The compartments in the apparatus contained the same 0.05 M sodium phosphate solution, but no papain.

The acidity of cell 10 was maintained at a constant pH of 4.0 and the pH of cell 11 was held constant at a pH of 12 by continuously replenishing these compartments with 0.05 M sodium phosphate solution. When the papain solution having a pH of about 5 was introduced into the supply compartment the current was turned on and a voltage of 50 volts was applied by means of impressing a voltage across electrodes 18 and 19. The pH in each of the intermediate zones was maintained substantially constant so that a pH gradient between the electrodes was maintained. Thus, the zones were maintained at pH values as follows:

| Zone: | pH |
|---|---|
| A | 4.9 |
| B | 5.8 |

Zone: | pH
--- | ---
C | 6.7
D | 7.6
E | 8.5
F | 9.4
G | 10.3
H | 11.2

As the papain solution passed through the electrical current the charged ampholytes responding to the impressed voltage migrated in a direction which neutralized the charge. Positively charged ampholytes migrated toward the cathode 18 while negatively charged ampholytes moved toward the anode 19. As these charged particles moved through the constant pH zones, their presence in each individual zone caused a change in the hydrogen ion concentration in that zone. The individual electrotitration devices in each zone responded to these small pH changes by automatically adding or removing electrons as required thereby returning the pH of the zone to the set value. This may cause evolution of hydrogen gas. The agitators in each zone serve to maintain the contents of that zone uniform.

The papain solution (about 1% protein) when introduced into the device is separated, with part of the ampholytic material migration toward the cathode and pure papain concentrating and precipitating in the zone maintained at pH closest to 8.65. The fractionation of a solution totalling about 500 ml. on a laboratory scale device required about 16 hours with an average voltage of 50 volts and an average current 100 ma.

This separation can be speeded up by employing a higher voltage in the range of about 100–600 volts and a current in the range of 100–500 ma. A working voltage above 5 volts/centimeter should be maintained, with the distance being the measure of the distance between anode and cathode. The upper limitation on the speed at which any ampholyte can be fractionated is determined by the amount of heat developed. Heat developed is dependent upon the power generated or $I^2R$ where R is dependent upon the size of the cell and the polarity of the electrolyte.

Thus, the apparatus can be employed to concentrate individual ampholytes from mixtures of ampholytes in zones of zero mobility for each. The mixed ampholyte solution is introduced into a supply zone, a voltage is impressed across the zone to cause the ampholytes to migrate in a pH gradient, and when a given ampholyte reaches a zone of zero mobility (isoelectric point) it is concentrated and removed. The pH gradient is automatically maintained by electrotitration responsive to small pH changes caused by migrating ampholytes.

It is possible by means of the present apparatus to sweep all of the colloidal elements present in the stream introduced into the appaartus into the various compartments through the members which restrict bulk flow. When these colloidal elements reach the compartment held at or near the isoelectric point of the colloid the material will accumulate and precipitate. Automatic pH sensing and adjusting devices operate in response to pH changes in individual compartments to insure maintenance of the pH gradient. The pH sensing and adjusting devices serve to insure neutralization of the charge on the colloid without dilution of the contents of the cell.

Obviously many modifications and variations of the invention as hereinbefore set forth may be made without departing from the spirit and scope thereof and, therefore only these limitations should be imposed as are indicated in the appended claims.

I claim:

1. Ampholyte fractionating apparatus including an anode cell and a cathode cell having interposed between said cells a plurality of fractionating cells arranged in series, each cell being separated from adjacent cells by members permeable to colloidal materials, each of said cells containing an aqueous electrolyte solution and being equipped with means for maintaining the pH of the solution in said cells constant in a pH gradient from a low pH in said anode cell to a high pH in said cathode cell, means for imposing a direct current voltage across said cells and means between said anode cell and said cathode cell for continuously circulating ampholyte containing liquid through said apparatus.

2. Ampholyte fractionating apparatus including an anode cell and a cathode cell, said anode cell containing an electrolyte maintained at a low pH and said cathode cell containing an electrolyte maintained at a high pH, said cells having a plurality of fractionating cells arranged in series therebetween, each of said cells containing said electrolyte, the pH of each cell being maintained constant in a pH gradient, each of said cells being separated from adjacent cells by members permeable to colloidal materials, said fractionating cells also being equipped with pH sensing and adjusting means to automatically maintain pH in said cells at a predetermined value, means for passing a direct electric current transversely through all said cells and said members, and means for continuously circulating ampholyte-containing liquid through said apparatus between said anode cell and said cathode cell.

3. Ampholyte fractionating apparatus including an anode cell and a cathode cell having a plurality of fractionating cells interposed between said anode cell and said cathode cell, means for maintaining said anode cell at a low pH, and means for maintaining said cathode cell at a high pH, each of said fractionating cells being separated by members permeable to colloidal materials and containing electrolyte solution maintained at a given pH, electrotitration means responsive to pH changes for automatically maintaining a set pH in each of said fractionating cells, means between said anode cell and said cathode cell for continuously circulating ampholyte-containing liquid through said apparatus, and means for imposing a direct electric current transversely through all said cells and members separating said cells.

4. A multi-compartment electrophoresis apparatus including a plurality of fractionating compartments and a sample compartment arranged in series between anode an cathode compartments, electrolyte solution in all of said compartments, each of said compartments being separated from adjacent compartments by members permeable to colloidal materials, said electrolyte being maintained at a given pH in a step-wise gradient from a low pH in said anode compartment to a high pH in said cathode compartment, and said sample compartment having means for continuous circulation of ampholyte solution, electrotitration means for automatically maintaining a set pH in each of said fractionating compartments operating responsive to changes in pH in said fractionating compartment to maintain the pH of the electrolyte in said fractionating compartment substantially constant, and means for impressing a direct current voltage across said apparatus transversely through all of said compartments and members separating said compartments.

5. A method for continuously separating colloidal organic ampholytes from an aqueous electrolyte solution containing said ampholytes comprising: introducing said solution into an electrophoretic apparatus; impressing a voltage across said liquid carrier in a direction transverse to the flow of said liquid whereby to cause said ampholytes to migrate toward a region of electrical charge opposite to that of ampholyte fractions; passing said ampholytes through members permeable to colloidal materials and through zones, measuring and adjusting the pH in said zones to maintain said zones at given pH values in a step-wise pH gradient; conducting said ampholyte to a zone maintained at a constant pH where the charge on said ampholyte is neutralized whereby to cause said ampholyte to precipitate from said liquid carrier; and recovering said precipitated ampholyte from said zone.

6. A method for continuously purifying proteolytic enzymes comprising introducing proteolytic enzymes containing impurities in an aqueous electrolyte solution into an electrophoretic apparatus; impressing a voltage across said solution in a direction transverse to the flow of said liquid whereby to cause said enzyme to migrate toward a region of electrical charge opposite to that of the enzyme, passing said enzyme through enzyme permeable members and through zones, measuring and adjusting the pH in said zones to maintain said zones at given pH values in a pH gradient; conducting said enzyme to a zone maintained at a pH where the charge on said enzyme is neutralized whereby to precipitate said enzyme from said liquid carrier, and recovering said precipitated enzyme from said zone.

References Cited by the Examiner

UNITED STATES PATENTS

| | | | |
|---|---|---|---|
| 1,546,908 | 7/1925 | Lapenta | 204—180 |
| 1,801,784 | 4/1931 | Schwarz | 204—180 |
| 3,051,640 | 8/1962 | Traxler | 204—180 |

OTHER REFERENCES

Alberty: Journal of Chemical Education, 8–48, pp. 426–433.

Alberty et al.: Physical Chemistry, 1958, pp. 513–517.

Alberty: The Proteins, vol. 1A, 1953, pp. 535–547.

Campbell et al.: Biochemical Journal, vol. 48, 1951, pp. 106–113.

Durrum: Journal of the American Chemical Society, vol. 72, July 1950, pp. 2943–2948.

Williams et al.: Society for Experimental Biology and Medicine, 1929, pp. 56–58.

JOHN H. MACK, *Primary Examiner.*